United States Patent
Meldrum

(10) Patent No.: US 9,063,553 B2
(45) Date of Patent: Jun. 23, 2015

(54) DUAL PURPOSE DESICCANT AND RECOVERY WHEEL

(71) Applicant: Carrier Corporation, Farmington, CT (US)

(72) Inventor: Ilye Meldrum, Terrebonne (CA)

(73) Assignee: CARRIER CORPORATION, Farmington, CT (US)

( * ) Notice: Subject to any disclaimer, the term of this patent is extended or adjusted under 35 U.S.C. 154(b) by 107 days.

(21) Appl. No.: 13/737,477

(22) Filed: Jan. 9, 2013

(65) Prior Publication Data

US 2013/0174733 A1 Jul. 11, 2013

Related U.S. Application Data

(60) Provisional application No. 61/584,991, filed on Jan. 10, 2012.

(51) Int. Cl.

| | |
|---|---|
| *B01D 53/06* | (2006.01) |
| *G05D 22/00* | (2006.01) |
| *F24F 3/14* | (2006.01) |
| *B01D 53/26* | (2006.01) |
| *G05D 22/02* | (2006.01) |

(52) U.S. Cl.
CPC ............... *G05D 22/00* (2013.01); *B01D 53/06* (2013.01); *F24F 3/1423* (2013.01); *B01D 53/261* (2013.01); *G05D 22/02* (2013.01)

(58) Field of Classification Search
CPC ............... B01D 53/06; B01D 53/261; B01D 2253/106; B01D 2257/80; F24F 3/1423
USPC .............. 95/113–115, 117, 123; 96/125, 144; 34/472, 473, 80; 236/44 R, 44 C; 62/94
See application file for complete search history.

(56) References Cited

U.S. PATENT DOCUMENTS

| | | | | |
|---|---|---|---|---|
| 3,009,684 | A | * | 11/1961 | Munters ............................. 165/7 |
| 4,926,618 | A | * | 5/1990 | Ratliff ............................... 95/10 |
| 5,148,374 | A | * | 9/1992 | Coellner .......................... 700/282 |
| 6,050,100 | A | * | 4/2000 | Belding et al. .................. 62/271 |
| 6,199,388 | B1 | * | 3/2001 | Fischer, Jr. ........................ 62/90 |
| 6,355,091 | B1 | * | 3/2002 | Felber et al. ...................... 95/10 |
| 6,406,522 | B1 | * | 6/2002 | McFadden et al. ............. 95/113 |
| 7,690,582 | B2 | * | 4/2010 | Matsui et al. ................ 236/44 C |
| 7,886,986 | B2 | * | 2/2011 | Fischer et al. ............... 236/49.3 |
| 8,328,904 | B2 | * | 12/2012 | Griffiths et al. .................... 95/10 |
| 2011/0239867 | A1 | * | 10/2011 | Matsuba et al. ................ 96/143 |

* cited by examiner

*Primary Examiner* — Frank Lawrence
(74) *Attorney, Agent, or Firm* — Cantor Colburn LLP

(57) ABSTRACT

A thermal energy recovery and humidity control system includes a rotating member including a desiccant material located to rotate across a supply air stream and a return airstream. A variable-speed drive element is operably connected to the rotating member to change a rotational speed of the rotating member to allow for switching between thermal energy recovery operation and humidity control operation of the system. A method of climate control includes rotating a desiccant member across both a supply air stream and a return airstream of a climate control system. The desiccant member is rotated at a first rotational speed to transfer thermal energy from the supply air stream to the return air stream. The desiccant member is rotated at a second rotational speed different than the first rotational speed to reduce humidity of the supply air stream.

14 Claims, 1 Drawing Sheet

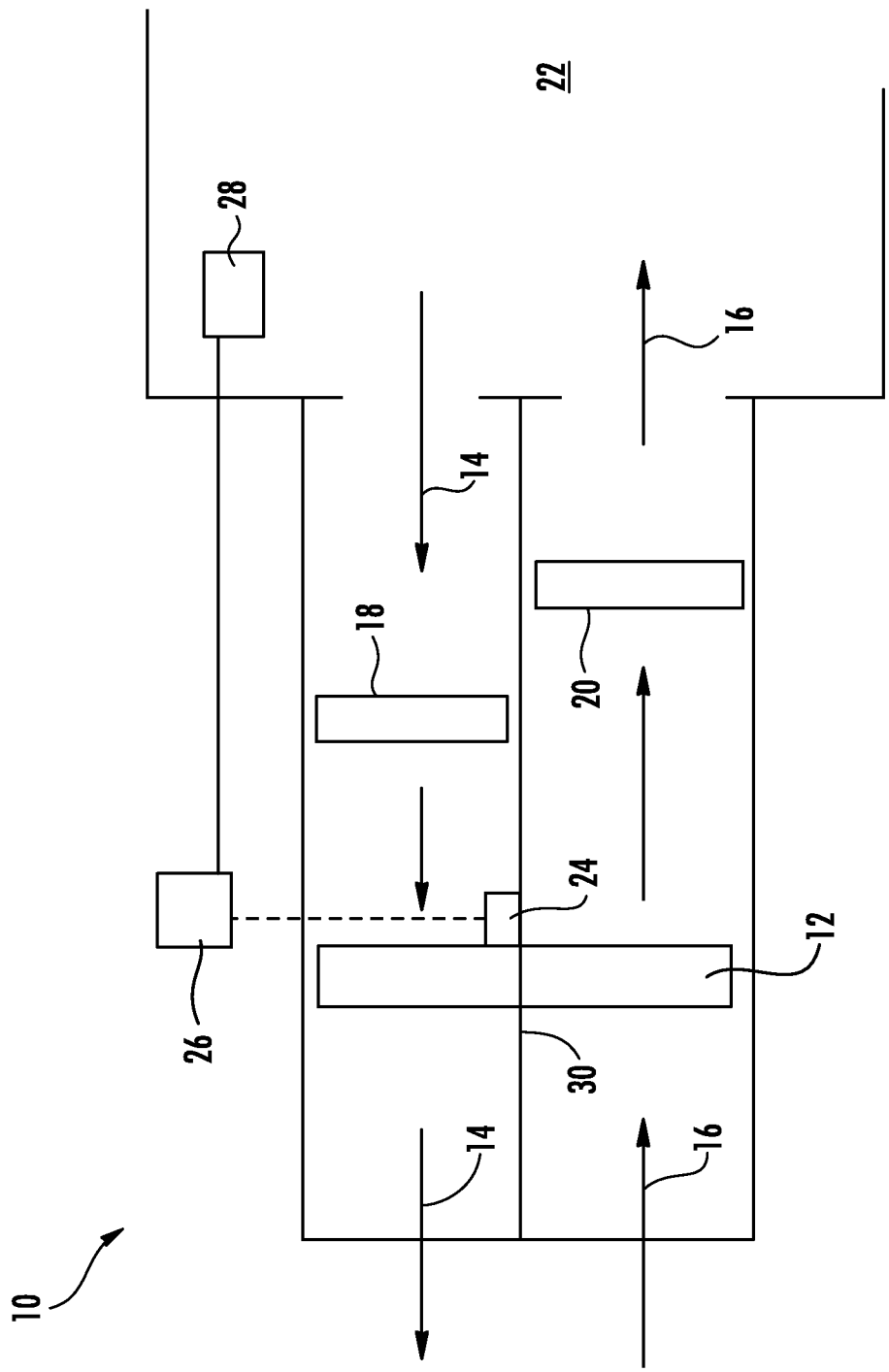

DUAL PURPOSE DESICCANT AND RECOVERY WHEEL

CROSS REFERENCE TO RELATED APPLICATIONS

This application claims priority to U.S. provisional application, 61/584,991, filed Jan. 10, 2012, the entire contents of which are incorporated herein by reference.

BACKGROUND OF THE INVENTION

The subject matter disclosed herein relates climate control systems. More specifically, the subject matter disclosed herein relates energy recovery and humidity control in climate control systems.

In some climate control systems, for example, chilled beam cooling systems or arenas used for multiple purposes including ice sports, humidity of the space served by the system may exceed acceptable limits under certain conditions, such as when the space occupancy is higher than expected. The increased humidity may result in undesired condensation in the space if air supplied to the space cannot be sufficiently dehumidified.

Such systems may include an energy-recovery system, such as a thermal wheel, to recover energy from return air and apply that energy to fresh air drawn into the system. The thermal wheel turns at a relatively high speed, for example, about 45 revolutions per minute, to optimize energy transfer. Return air is passed through the wheel, transferring energy to the wheel. As the wheel rotates, this energy is then transferred to an incoming fresh air stream to cool the fresh air.

Further, to control humidity, the climate control system may include a separate humidity control system such as a desiccant system arranged in series with the thermal wheel. The desiccant system is used to remove humidity from the incoming fresh air. A precool coil cools the incoming fresh air which results in condensation on a slowly rotating, for example, at about 4 rotations per hour, desiccant wheel. The return air is heated by a reactivation heat source. As the heated return air is passed through the rotating wheel, condensation is removed from the wheel in the form of vapor.

BRIEF DESCRIPTION OF THE INVENTION

A thermal energy recovery and humidity control system includes a rotating member including a desiccant material located to rotate across a supply air stream and a return airstream. A variable-speed drive element is operably connected to the rotating member to change a rotational speed of the rotating member to allow for switching between thermal energy recovery operation and humidity control operation of the system.

A method of climate control includes rotating a desiccant member across both a supply air stream and a return airstream of a climate control system. The desiccant member is rotated at a first rotational speed to transfer thermal energy from the supply air stream to the return air stream. The desiccant member is rotated at a second rotational speed different than the first rotational speed to reduce humidity of the supply air stream.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The FIGURE is a schematic of an embodiment of an energy recovery and humidity control system.

The detailed description explains embodiments of the invention, together with advantages and features, by way of example with reference to the drawings.

DETAILED DESCRIPTION OF THE INVENTION

Shown in the FIGURE is a schematic of a combined energy recovery and humidity control system 10 for a climate control system, for example, a chilled beam system. The system 10 includes a wheel 12 located between a return air stream 14 and a supply air stream 16. The wheel 12 is located such that it rotates about an axis 30 across both the return air stream 14 and supply air stream 16. The wheel 12 includes a moisture absorbing material, such as a wound silica gel desiccant.

The system 10 further includes a heat source 18, such as a reactivation heat source. The heat source 18 is typically a heating coil employing heated water or steam from a building supply system, or electric or gas fired heaters. The heat source 18 is used only when dehumidification is necessary and improves the dehumidification effectiveness of the rotating wheel 12. The heat source 18 is located across the return air stream 14 to heat the return air stream 14, when desired, prior to the return air stream 14 encountering the wheel 12. In some embodiments, the system 10 includes a cooling coil 20 located to cool the incoming supply air stream 16 downstream of the wheel 12, so that the supply air stream 16 is provided to a serviced space 22 at a selected temperature. The wheel 12 is operably connected to a variable frequency drive (VFD) 24, or other multi-speed drive such as or gear or belt operated system configured to change the rotational speed of the wheel 12. The VFD 24 is operably connected to a controller 26, to drive the VFD 24 at a selected speed depending on operating conditions of the system 10. In some embodiments, a humidity sensor 28 to sense humidity of the serviced space 22 is connected to the controller 26 and/or the VFD 24.

When humidity is within a selected desired operating range, for example as sensed by the humidity sensor 28, the system 10 operates in thermal energy recovery mode. The VFD 24 drives the rotation of the wheel 12 at a thermal energy recovery speed, for example, about 45 rpm or higher, which in some embodiments is a function of the material of the wheel 12. A relatively cool return airstream 14 flows across the wheel 12 and in a thermal energy exchange with the wheel 12, heat from the wheel 12 is transferred to the return air stream 14, and the return air stream 14 is exhausted, in some embodiments, to ambient. The supply airstream 16 flows across a relatively cool portion of the rotating wheel 12, due to the transfer with the return airstream 14. The supply airstream 16 transfers thermal energy to the wheel 12, heating the wheel 12 and cooling the supply airstream 16. If additional cooling of the supply airstream 16 is needed or desired, the cooling coil 20 downstream of the wheel 12 is activated.

When humidity is not within a selected desired operating range, in some embodiments as sensed by the humidity sensor 28, the system 10 operates in desiccant, or humidity control, mode. The VFD 24 slows rotation of the wheel 12 to a speed for desiccant operation, for example, between 0 and 10 revolutions per hour, or in some embodiments about 4 revolutions per hour. In desiccant mode, the supply airstream 16 flows across the wheel 12, which because of its slower rotation and desiccant material, causes transfer of moisture from the supply airstream 16 to the wheel 12, for example by absorption or adsorption. The supply airstream 16 is then cooled by the cooling coil 20 before use in the protected space 22. The return airstream 14 is heated by the heat source 18 before flowing across the wheel 12. Since the return airstream 14 is heated, it removes the previously adsorbed or absorbed moisture from the rotating wheel 12 and exhausts the moisture as vapor.

The system described herein eliminates the need for the separate thermal energy recovery and humidity control systems of the prior art, further a typical humidity control, or desiccant system, often requires a pre-cool coil upstream of the desiccant wheel to cool the airflow before encountering the desiccant wheel. In the system described herein, desiccant dehumidification may be achieved without the use of a pre-cool coil.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A thermal energy recovery and humidity control system comprising:
    a rotating member including a desiccant material disposed to rotate across a supply air stream and a return airstream; and
    a variable-speed drive element operably connected to the rotating member to change a rotational speed of the rotating member to allow for switching between thermal energy recovery operation and humidity control operation of the system, wherein the rotational speed of the rotating member for thermal energy recovery operation is 45 rpm or higher.

2. The system of claim 1, further comprising a heat source to heat the return airstream prior to flowing across the rotating member.

3. The system of claim 1, further comprising a cooling coil to cool the supply air stream after flowing across the rotating member.

4. The system of claim 1, wherein the rotating member is a desiccant wheel.

5. The system of claim 4, wherein the desiccant wheel includes a wound silica gel desiccant material.

6. The system of claim 1, wherein the rotational speed of the rotating member for humidity control operation is between 0 and 10 revolutions per hour.

7. The system of claim 1, wherein the variable-speed drive element is one of a variable frequency drive or gear or belt operated system configured to change the rotational speed.

8. The system of claim 1, further comprising a controller in operational communication with the drive element to direct switching between energy recovery operation and humidity control operation.

9. A method of climate control comprising:
    rotating a desiccant member disposed across both a supply air stream and a return airstream of a climate control system at a first rotational speed to transfer thermal energy from the supply air stream to the return air stream, wherein the first rotational speed is about 45 rpm or above; and
    rotating the desiccant member at a second rotational speed different than the first rotational speed to reduce humidity of the supply air stream.

10. The method of claim 9, wherein transferring thermal energy from the supply air stream to the return air stream comprises:
    flowing the supply air stream past the rotating desiccant member;
    transferring thermal energy from the supply air stream to the rotating desiccant member;
    flowing the return air stream past the rotating desiccant member; and
    transferring the thermal energy from the rotating desiccant member to the return air stream.

11. The method of claim 9, wherein reducing humidity of the supply air stream comprises:
    flowing the supply air stream past the rotating desiccant member;
    transferring moisture in the supply air stream onto the rotating desiccant member; and
    flowing the return airstream past the rotating desiccant wheel, thereby removing the moisture from the rotating desiccant wheel.

12. The method of claim 11, further comprising heating the return air stream prior to flowing the return air stream past the rotating desiccant wheel.

13. The method of claim 11, further comprising cooling the supply air stream after flowing the supply air stream past the rotating desiccant member.

14. The method of claim 9, wherein the second rotational speed is 0 to 10 revolutions per hour.

* * * * *